UNITED STATES PATENT OFFICE.

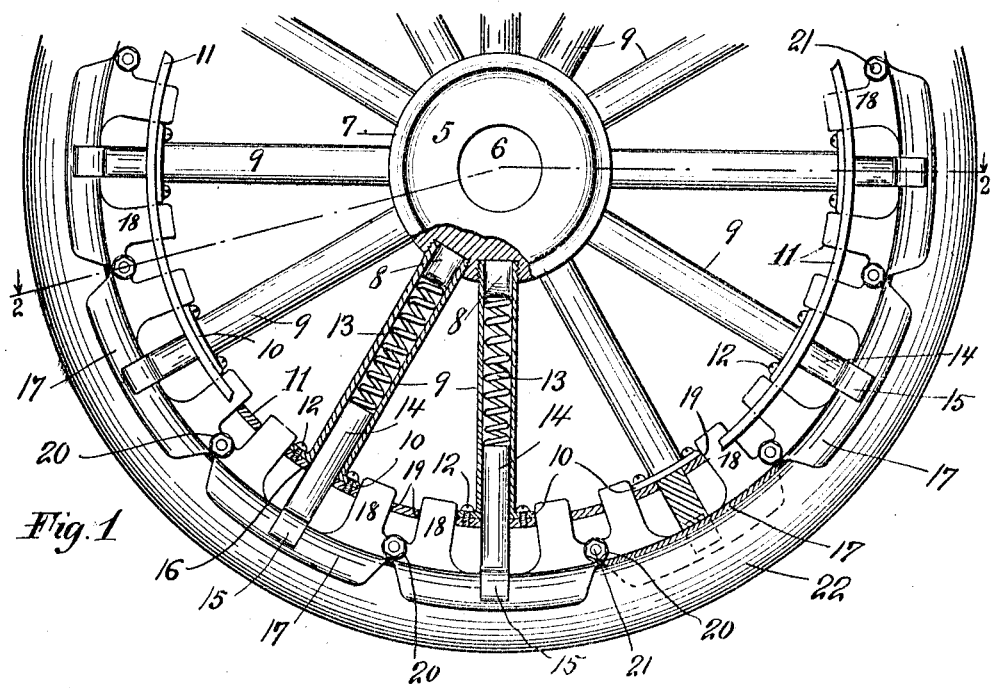

KRISTIAN KARL STRUBE, OF TRENTON, NEW JERSEY.

WHEEL.

970,569.　　　　　Specification of Letters Patent.　　Patented Sept. 20, 1910.

Application filed July 24, 1909. Serial No. 509,262.

*To all whom it may concern:*

Be it known that I, KRISTIAN KARL STRUBE, a subject of the King of Denmark, and a resident of Trenton, Mercer county, New Jersey, have invented certain new and useful Improvements in Wheels, of which the following is a specification.

This invention relates to improvements in wheels and has particular reference to an improved type of wheel for use in connection with self propelled vehicles.

The particular object of the invention is to provide a wheel in which a solid rubber tire forms the outer rim and at the same time embody in the structure such means as will provide the necessary resiliency demanded by self propelled vehicles.

Another object is to construct the wheel in such a manner that repairs may be quickly made and without requiring special tools or skilled labor.

In order that the above and other objects may be accomplished I have embodied my invention in the structure hereinafter set forth while reference is had to the accompanying drawing in which—

Figure 1 is a side elevation of a portion of a wheel illustrating the invention and with parts in section. Fig. 2 is a section on the line 2—2 of Fig. 1. Fig. 3 is a detail view of the rigid inner rim and Fig. 4 is a detail view of one of the felly segments.

In the drawing the numeral 5 represents a hub of any suitable form and size and provided with a central bore 6 for fitting the wheel to an axle.

7 denotes a reinforcement provided with threaded sockets for the reception of the inner threaded ends 8 of the hollow spokes 9 the outer ends of which are provided with a flange 10 adapted to be fastened to the rigid rim 11 by screws 12. For the purposes of strength and appearance the spokes may preferably be oval in cross section as will be readily understood from Figs. 1 and 2. Each spoke contains an expansion spring 13 the outer end of which engages a piston 14 to force the same outward. The piston terminates in a shoe 15 and passes through an opening 16 in the aforesaid rim 11. The piston shoes abut the segment members 17 each of which comprises the concavo-convex rim portion 17 having two guiding lugs 18 which play in the openings 19 in the rim 11. Each segment has further at the ends thereof lugs 20 which are hinged to the other lugs 20 on the adjacent segments by means of bolts 21. In this manner all the segments form a yieldable felly which contains the solid rubber tire 22.

From the above it will be understood that the wheel comprises a solid or rigid inner structure consisting of the hub, the hollow spokes and the rim 11; and an outer flexible structure formed by the segmental felly containing the rubber tire and under the outward pressure of the springs on the pistons. Hence any thrust or pressure on the circumference of the wheel is taken up by one or more pistons directly and as the springs are compressed the flexible felly yields to the pressure. The result is that the flattening of the tire due to the weight of the vehicle or to obstructions in the road is distributed to both sides of the point of contact by means of the segments, while the pistons resist the pressure direct.

The number of segments and the precise manner in which they are connected as well as other changes in the construction of the wheel may of course be made without departing from the scope of the invention.

I claim all such changes as may properly be said to come within the legitimate and intended scope of the invention and the claim.

What I claim is:—

The combination of a hub, a rigid rim, hollow spokes connecting said hub and rim, an outer flexible felly comprising a plurality of segments hinged together and having their abutting edges inclined toward the hinge, each segment being of concave cross section for the reception of a tire, guiding lugs on each segment adjacent the hinges and adapted to guide the radial movement of the segment by passing through slots provided in the said rim, separate pistons in the said spokes, one for each segment, each piston comprising a smooth stem and a concave foot, springs within the spokes for forcing the pistons outward through openings in the said rim and to cause the foot of the piston to abut the segment between the guiding lugs aforesaid and in the center of the segment.

Signed at Trenton, N. J., this 21st day of July 1909.

KRISTIAN KARL STRUBE.

Witnesses:
　C. A. WORTHINGTON,
　CHRISTIAN STRUBE.